(12) United States Patent
Yoon et al.

(10) Patent No.: US 8,305,379 B2
(45) Date of Patent: *Nov. 6, 2012

(54) METHOD FOR MANAGING ANIMATION CHUNK DATA AND ITS ATTRIBUTE INFORMATION FOR USE IN AN INTERACTIVE DISC

(75) Inventors: Woo Seong Yoon, Namyangloo-si (KR); Jea Yong Yoo, Seoul (KR); Limoniv Alexandre, Seoul (KR); Byung Jin Kim, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 1469 days.

This patent is subject to a terminal disclaimer.

(21) Appl. No.: 11/896,086

(22) Filed: Aug. 29, 2007

(65) Prior Publication Data

US 2007/0297771 A1 Dec. 27, 2007

Related U.S. Application Data

(63) Continuation of application No. 10/681,015, filed on Oct. 7, 2003, now Pat. No. 7,295,207.

(60) Provisional application No. 60/446,346, filed on Feb. 10, 2003.

(30) Foreign Application Priority Data

Mar. 7, 2003 (KR) .......................... 10-2003-0014458

(51) Int. Cl.
*G06T 15/00* (2011.01)

(52) U.S. Cl. ........ 345/473; 345/474; 345/475; 370/412; 386/248; 455/500; 710/33; 710/36

(58) Field of Classification Search ................... 345/473, 345/474, 475; 370/412; 386/248; 455/500; 707/205, 501.1; 710/33, 36
See application file for complete search history.

(56) References Cited

U.S. PATENT DOCUMENTS

| 6,714,202 | B2 | 3/2004 | Dorrell | |
|---|---|---|---|---|
| 7,515,599 | B2 * | 4/2009 | Chung et al. | 370/412 |
| 7,653,288 | B2 * | 1/2010 | Jung et al. | 386/248 |

FOREIGN PATENT DOCUMENTS

| EP | 0788094 | | 8/1997 |
|---|---|---|---|
| EP | 1267352 | A2 | 12/2002 |
| JP | 10-136314 | | 5/1998 |
| JP | 10-145722 | A | 5/1998 |

(Continued)

OTHER PUBLICATIONS

Glenn Randers-Pherson: "MNG (Multiple-image Network Graphics) Format Version 1.0" XP-002459653, Jan. 11, 2001.

(Continued)

*Primary Examiner* — Phu K Nguyen
(74) *Attorney, Agent, or Firm* — Birch, Stewart, Kolasch & Birch, LLP

(57) ABSTRACT

In accordance with one or more embodiments, a method and system of managing animation data and related control data for recording on an enhanced navigation medium is provided. The method comprises constructing animation data comprising first image data into a first graphic MNG file in chunk data format, wherein the first graphic file comprises a first header portion, a second end portion, first control data and a frame containing additional data; and recording the first graphic file on an enhanced navigation medium.

8 Claims, 7 Drawing Sheets

FOREIGN PATENT DOCUMENTS

| | | |
|---|---|---|
| JP | 11-069308 A | 9/1999 |
| JP | 2001-006334 | 1/2001 |
| JP | 2001-118321 | 4/2001 |
| JP | 2001-197415 | 7/2001 |
| JP | 2002-124069 | 4/2002 |
| JP | 2002-191027 A | 7/2002 |
| JP | 2002-352444 | 12/2002 |
| KR | 1999-0063898 | 7/1999 |
| WO | WO-97/13361 | 4/1997 |
| WO | WO-01/31497 A1 | 3/2001 |
| WO | WO-2004/068490 A1 | 8/2004 |

OTHER PUBLICATIONS

Gross, File Format for Data Exchange Between Graphic Data Bases, Design Automation Conference, Jun. 1978, pp. 54-59.

Doll, Data Communication, John Wiley and Sons, Apr. 1978, pp. 364-367, 378-387.

* cited by examiner

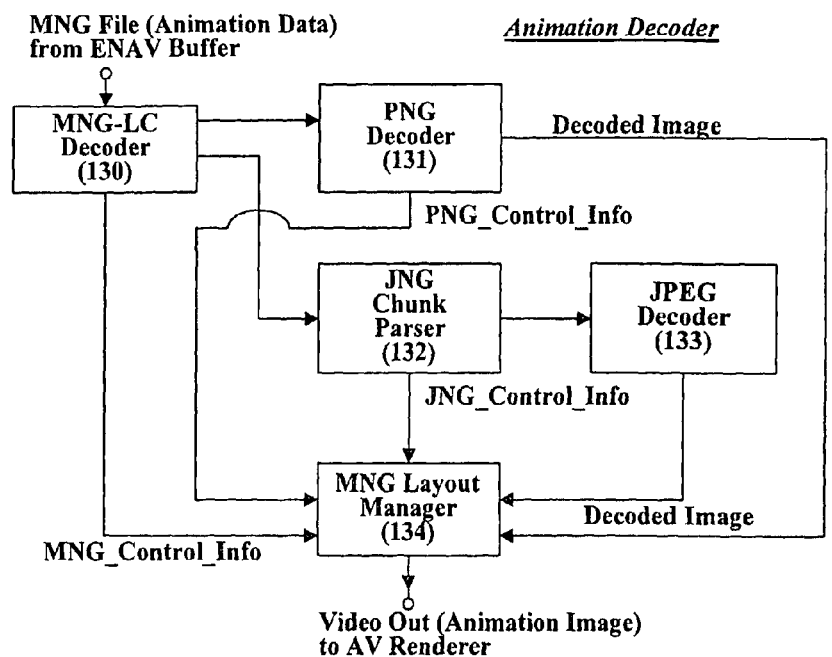

FIG. 6

*Critical MNG Image Defining Chunks*

| Name | Description | Attribute | Bytes | Value | Comment |
|---|---|---|---|---|---|
| DEFI | Define an object | Object_id | 2B | 0x0000 | MNG_LC restriction |
| | | Do_not_show | 1B | (0x00 visible) | Only one object |
| | | Concrete_flag | 1B | 0x00 | MNG-LC restriction |
| | | X_location | 4B | 0 to Frame_width | Default is 0 |
| | | Y_location | 4B | 0 to Frame_height | Default is 0 |
| | | Left_cb | 4B | 0 to Frame_width | Default is 0 |
| | | Right_cb | 4B | 0 to Frame_width | Default is Frame_width |
| | | Top_cb | 4B | 0 to Frame_height | Default is 0 |
| | | Bottom_cb | 4B | 0 to Frame_height | Default is Frame_width |
| PLTE | Global palette | - | Max (256x3)B | 0 to 255 | - |
| tRNS | Global transparency array | - | Max 256B | 0 to 255 | Note |
| IHDR/ JHDR | - | - | - | - | Same format as PNG IHDR/JNG JDAT |
| IDAT/ JDAT | - | - | - | - | Same format as PNG IDAT/JNG JDAT |
| IEND | - | - | - | - | Same format as PNG IEND/JNG IEND |
| TERM | Termination action | Termination_action | 1B | 0,1,2,3 | - |
| | | Action_after_iteration | 1B | 0,1,2 | Must be omitted unless Termination_action is 3 |
| | | Delay | 4B | - | |
| | | Iteration_max | 4B | - | |

FIG. 7

*Critical MNG Image Displaying Chunks*

| Name | Description | Attribute | Bytes | Value | Comment |
|---|---|---|---|---|---|
| BACK | Background | Red_background | 2B | - | - |
| | | Green_background | 2B | - | |
| | | Blue_background | 2B | - | |
| FRAM | Frame definition | - | - | - | Follow the MNG-LC version 1.0 |

FIG. 8

*Critical PNG Chunks*

| Name | Description | Attribute | Bytes | Value | Comment |
|---|---|---|---|---|---|
| IHDR | Image header | Width | 4B | 0 to 720 | Within NTSC and PAL |
| | | Height | 4B | 0 to 480 (576) | Within NTSC (PAL) |
| | | Bit Depth | 1B | 1,2,4,8,16 | - |
| | | Color type | 1B | 0,2,3,4,6 | - |
| | | Compression method | 1B | 0x00 | - |
| | | Filter method | 1B | 0x00 | - |
| | | Interlace method | 1B | 0x00 | No interlace |
| PLTE | Palette | - | Max (256x3) B | 0 to 255 | - |
| IDAT | Image data | - | - | - | Note |
| IEND | Image trailer | - | 0B | - | Empty chunk |

FIG. 9

*Ancillary PNG Chunks*

| Name | Description | Attribute | Bytes | Value | Comment |
|---|---|---|---|---|---|
| tRNS | Transparency | - | Max 256B | 0 to 255 | Note 1 |
| gAMA | Image gamma | - | 4B | (45455 sRGB) | Note 2 |
| cHRM | Primary chromaticities | White point x | 4B | (31270 sRGB) | Note 3 |
| | | White point y | 4B | (32900 sRGB) | |
| | | Red point x | 4B | (64000 sRGB) | |
| | | Red point y | 4B | (33000 sRGB) | |
| | | Green point x | 4B | (30000 sRGB) | |
| | | Green point y | 4B | (60000 sRGB) | |
| | | Blue point x | 4B | (15000 sRGB) | |
| | | Blue point y | 4B | (6000 sRGB) | |
| sRGB | Standard RGB color space | - | 1B | 0,1,2,3 | Note 4 |
| pHYs | Physical pixel dimensions | Pixels per unit x | 4B | (180,4:3) (135, 16:9) | Note 5 |
| | | Pixels per unit y | 4B | (160, NTSC) (192, PAL) | |
| | | Unit specifier | 1B | 0x00 | |

FIG. 10

*Critical JNG Chunks*

| Name | Description | Attribute | Bytes | Value | Comment |
|---|---|---|---|---|---|
| JHDR | JNG header | Width | 4B | 0 to 720 | Within NTSC and PAL |
| | | Height | 4B | 0 to 480 (576) | Within NTSC (PAL) |
| | | Color type | 1B | 8,10,12,14 | - |
| | | Image_sample_depth | 1B | 0x08 | 8bits |
| | | Image_compression method | 1B | 0x08 | Huffman-coded baseline JPEG |
| | | Image_interlace_method | 1B | 0x00 | Sequential JPEG |
| | | Alpha_sample_depth | 1B | 0,1,2,4,8,16 | - |
| | | Alpha_compression method | 1B | 0x08 | JDAA format |
| | | Alpha_filter method | 1B | 0x00 | - |
| | | Alpha_interlace_method | 1B | 0x00 | - |
| JDAT | Image data | - | - | - | Note |
| IEND | Image trailer | - | 0B | - | Empty chunk |

FIG. 11

*Ancillary JNG Chunks*

| Name | Description | Attribute | Bytes | Value | Comment |
|---|---|---|---|---|---|
| gAMA | Image gamma | - | 4B | (45455 sRGB) | Note 1 |
| cHRM | Primary chromaticities | White point x | 4B | (31270 sRGB) | Note 2 |
| | | White point y | 4B | (32900 sRGB) | |
| | | Red point x | 4B | (64000 sRGB) | |
| | | Red point y | 4B | (33000 sRGB) | |
| | | Green point x | 4B | (30000 sRGB) | |
| | | Green point y | 4B | (60000 sRGB) | |
| | | Blue point x | 4B | (15000 sRGB) | |
| | | Blue point y | 4B | (6000 sRGB) | |
| sRGB | Standard RGB color space | - | 1B | 0,1,2,3 | Note 3 |
| pHYs | Physical pixel dimensions | Pixels per unit x | 4B | (180, 4:3) (135, 16:9) | Note 4 |
| | | Pixels per unit y | 4B | (160, NTSC) (192, PAL) | |
| | | Unit specifier | 1B | 0x00 | |

METHOD FOR MANAGING ANIMATION CHUNK DATA AND ITS ATTRIBUTE INFORMATION FOR USE IN AN INTERACTIVE DISC

CROSS-REFERENCE TO RELATED APPLICATIONS

This is a Continuation Application of U.S. application Ser. No. 10/681,015 filed Oct. 7, 2003now U.S. Pat. No. 7,295,207, which is incorporated by reference. Pursuant to 35 U.S.C. §119(e) (1), this application claims the benefit of earlier filing date and right of priority to Provisional Patent Application No. 60/446,346, filed on Feb. 10, 2003, entitled "Data Structure of Enhanced Audio/Video Contents and Related Decoder", the content of which is hereby incorporated by reference herein in its entirety. Also, pursuant to 35 U.S.C. §119(a), this application claims the benefit of earlier filing date and right of priority to Korean Patent Application No. 10-2003-0014458 filed on Mar. 7, 2003, the content of which is hereby incorporated by reference herein in its entirety.

BACKGROUND OF THE INVENTION

1. Field of the Invention

The present invention relates to a method for managing animation chunk data and its attribute information for use in an enhanced navigation medium, such as an interactive optical disc, and more particularly to a method for managing animation chunk data and its attribute information for use in an I-DVD (Interactive Digital Versatile Disk) or eDVD (Enhanced Digital Versatile Disk) in such a way that it can reproduce various animation data associated with audio/video (A/V) data.

2. Related Art

High-density optical discs are capable of recording and storing digital data. Digital versatile discs (DVDs) are high-capacity recording mediums capable of permanently recording and storing not only high-quality digital audio data, but also high-quality moving picture data.

A DVD includes (1) a data stream recording area for recording a digital data stream, such as moving picture data, and (2) a navigation data recording area for recording navigation data needed for controlling playback of the moving picture data.

Thus, a general DVD player first reads the navigation data recorded on the navigation data recording area. If the DVD is seated in the player, the player stores the read navigation data in a memory provided in the player, and reproduces the moving picture data recorded on the data stream recording area using the navigation data. The DVD player reproduces the moving picture data recorded on the DVD, such that a user can see and hear a movie recorded on the DVD.

Additional information associated with the playback of audio/video (A/V) data can be recorded on a DVD. This information may include, document-type content file (e.g., an HTML (HyperText Markup Language), a SMIL (Synchronized Multimedia Integration Language), a CSS (Cascading Style Sheet), a scripting language (i.e., ECMAScript)), a data-type content file (e.g., image data (e.g., JPEG or PNG), audio data (e.g., AC-3, MPEG audio, DTS, or SDDS), animation data (e.g., MNG)) and text/font data.

Standardization of an interactive digital versatile disc (I-DVD) is ongoing. The A/V data recorded on the I-DVD is reproduced according to the user's interactive request. Where I-DVDs are commercialized, the supply of various contents, associated with the main A/V data, through digital recording mediums will be more prevalent, resulting in greater convenience to the user.

A method for receiving/reading the above-identified various content files from a content server while simultaneously reproducing the main A/V data recorded on DVDs is being implemented. An effective method for reproducing the main A/V data and its related contents such as various animation data upon receiving a user's request is needed.

SUMMARY OF THE INVENTION

In accordance with one or more embodiments, a method of managing animation data and related control data for recording on an enhanced navigation medium is provided. The method comprises constructing animation data comprising first image data into a first graphic MNG file in chunk data format, wherein the first graphic file comprises a first header portion, a second end portion, first control data and a frame containing additional data; and recording the first graphic file on an enhanced navigation medium.

The frame containing the additional data comprises a second graphic file. The frame containing the additional data comprises a third graphic file. The frame containing the additional data comprises at least one of a second graphic file and a third graphic file. The second graphic file comprises second image data and second control data for controlling playback of the animation data in the first graphic file.

In some embodiments, the third file comprises third image data and third control data for controlling playback of the animation data in the first graphic file. The enhanced navigation medium is an interactive digital versatile disk (I-DVD). At least one of the second graphic file and the third graphic file comprises fourth control information for controlling playback of the first image data. The first graphic file may further comprise termination action information, physical pixel size information, palette information, and transparency information The first graphic file further may also comprise at least one of termination action information, physical pixel size information, palette information, transparency information constructed in advance of the frame containing additional data, for example. The frame containing the additional data comprises a plurality of at least one of the second graphic file and the third graphic file. The second graphic file comprises at least one of second header information, second image data, and second image end information.

In some embodiments, the second graphic PNG file further comprises at least one of second physical pixel size information, second standard RGB information, second gamma information, second critical chromaticity information, second palette information, and second transparency information. At least one of second physical pixel size information, second standard RGB information, second gamma information, second critical chromaticity information, second palette information, and second transparency information is constructed between the second header information and the second object image data.

At least one of second physical pixel size information, second standard RGB information, second gamma information, second critical chromaticity information, second palette information, and second transparency information is utilized for controlling playback of the second image data. The third graphic file comprises at least one of third header information, third object image data, and third image end information.

In one or more embodiments, the third graphic file further comprises at least one of third physical pixel size information, third standard RGB information, third gamma information, third critical chromaticity information, third palette information, and third transparency information. At least one of third physical pixel size information, third standard RGB information, third gamma information, third critical chromaticity information, third palette information, and third transparency information is constructed between the third JNG header information and the third object image data.

In another embodiment, at least one of third physical pixel size information, third standard RGB information, third gamma information, third critical chromaticity information, third palette information, and third transparency information is utilized for controlling playback of the third JPEG image data.

In accordance with another embodiment, an enhanced navigation medium comprises audio/visual (A/V) data; navigation data for controlling reproduction of the A/V data by an enhanced navigation player; and structural configuration for packaging the A/V and control data, wherein the structural configuration comprises a data frame comprising a first graphic file having animation information. The first graphic file comprises first chunk data; and at least one of second chunk data and third chunk data.

The first chunk data comprises a first header frame identifier; a first end frame identifier; and first control information. In certain embodiments, an enhanced navigation data structure for packaging animation data for reproduction by an enhanced navigation player, the data structure comprising a first graphic file comprising a audio/visual (A/V) data; navigation data for controlling reproduction of the A/V data by an enhanced navigation player.

The A/V data and the navigation data are packaged into first chunk data; and at least one of second chunk data and third chunk data. The first chunk data comprises a first header frame identifier; a first end frame identifier; and first control information. The second chunk data comprises a second header frame identifier; a second end frame identifier; and second control information. In some embodiments the third chunk data comprises a third header frame identifier; a third end frame identifier; and third control information, for example.

In accordance with yet another embodiment, a method of managing animation data and related control data for recording on an enhanced navigation medium, the method comprises constructing animation data comprising A/V image data into a MNG (Multimedia Network Graphics) file in chunk data format, wherein the MNG file comprises a MNG header portion, a MNG end portion, MNG control data and a frame containing additional data; and recording the MNG file on an enhanced navigation medium.

The frame containing the additional data comprises a PNG (Portable Network Graphics) file. The frame containing the additional data comprises a JNG (JPEG Network Graphics) file. The frame containing the additional data comprises at least one of PNG (Portable Network Graphics) file and a JNG (JPEG Network Graphics) file. The PNG file comprises PNG image data and PNG control data for controlling playback of the animation data in the MNG file. The JNG file comprises JNG image data and JNG control data for controlling playback of the animation data in the MNG file.

At least one of the PNG file and the JNG file comprises fourth control information for controlling playback of the first A/V image data. The MNG file further comprises termination action information. The MNG file may further comprise physical pixel size information. The MNG file further comprises palette information and transparency information. In certain embodiments, the MNG file comprises at least one of termination action information, physical pixel size information, palette information, transparency information constructed in advance of the frame containing additional data.

The frame containing the additional data can comprise a plurality of at least one of the PNG file and the JNG file. The PNG file comprises at least one of PNG header information, object PNG image data, and second image end information. The PNG file further comprises at least one of second physical pixel size information, second standard RGB information, second gamma information, second critical chromaticity information, second palette information, and second transparency information.

The at least one of second physical pixel size information, second standard RGB information, second gamma information, second critical chromaticity information, second palette information, and second transparency information is constructed between the PNG header information and the object PNG image data. The at least one of second physical pixel size information, second standard RGB information, second gamma information, second critical chromaticity information, second palette information, and second transparency information is utilized for controlling playback of the object PNG image data.

The JNG file comprises at least one of JNG header information, object JPEG image data, and third image end information. The JNG file further comprises at least one of third physical pixel size information, third standard RGB information, third gamma information, third critical chromaticity information, third palette information, and third transparency information.

In some embodiments, at least one of third physical pixel size information, third standard RGB information, third gamma information, third critical chromaticity information, third palette information, and third transparency information is constructed between the JNG header information and the object JPEG image data. At least one of third physical pixel size information, third standard RGB information, third gamma information, third critical chromaticity information, third palette information, and third transparency information is utilized for controlling playback of the object JPEG image data.

In accordance with one or more embodiments of the invention an enhanced navigation medium comprises audio/visual (A/V) data; navigation data for controlling reproduction of the A/V data by an enhanced navigation player; and structural configuration for packaging the A/V and control data, wherein the structural configuration comprises a data frame comprising an MNG (Multimedia Network Graphics) file having animation information.

The MNG file comprises MNG chunk data; and at least one of PNG (Portable Network Graphics) chunk data and JNG (JPEG Network Graphics) chunk data. The MNG chunk data comprises a MNG header frame identifier; a MNG end frame identifier; and MNG control information. An enhanced navigation data structure for packaging animation data for reproduction by an enhanced navigation player, the data structure comprising a first graphic file comprising a audio/visual (A/V) data; navigation data for controlling reproduction of the A/V data by an enhanced navigation player.

The A/V data and the navigation data are packaged into a first graphic data format, and at least one of second graphic data format and third graphic data format. The first graphic data format comprises a first header frame identifier; a first end frame identifier; and first control information. The second graphic data format comprises a second header frame identifier; a second end frame identifier; and second control information. In some embodiments, the third graphic data format comprises a third header frame identifier; a third end frame identifier; and third control information.

In accordance with yet another embodiment, a data structure for managing animation data and related control data for recording on an enhanced navigation medium, the data structure comprises animation data comprising first image data into a first graphic file in chunk data format, wherein the first graphic file comprises a first header portion, a second end portion, first control data and a frame containing additional data.

The frame containing the additional data comprises a second graphic file. The frame containing the additional data comprises a third graphic file. The frame containing the additional data comprises at least one of a second graphic file and a third graphic file. The second graphic file comprises second image data and second control data for controlling playback of the animation data in the first graphic file.

The third file comprises third image data and third control data for controlling playback of the animation data in the first graphic file. The enhanced navigation medium is an interactive digital versatile disk (I-DVD), in one embodiment, for example.

At least one of the second graphic file and the third graphic file comprises fourth control information for controlling playback of the first A/V image data. The first graphic file further comprises termination action information. The first graphic file further comprises physical pixel size information. The first graphic file further comprises palette information. The first graphic file further comprises transparency information.

In one embodiment, the first graphic file further comprises at least one of termination action information, physical pixel size information, palette information, transparency information constructed in advance of the frame containing additional data and the frame containing the additional data comprises a plurality of at least one of the second graphic file and the third graphic file.

The second graphic file comprises at least one of second header information, second object image data, and second image end information. The second graphic file may further comprise at least one of second physical pixel size information, second standard information, second gamma information, second critical chromaticity information, second palette information, and second transparency information.

In one or more embodiments, at least one of second physical pixel size information, second standard information, second gamma information, second critical chromaticity information, second palette information, and second transparency information is constructed between the second header information and the second object image data. At least one of second physical pixel size information, second standard RGB information, second gamma information, second critical chromaticity information, second palette information, and second transparency information is utilized for controlling playback of the second object image data.

The third graphic file comprises at least one of third header information, third image data, and third image end information. The third graphic file further comprises at least one of third physical pixel size information, third standard RGB information, third gamma information, third critical chromaticity information, third palette information, and third transparency information. At least one of third physical pixel size information, third standard RGB information, third gamma information, third critical chromaticity information, third palette information, and third transparency information is constructed between the third header information and the third object image data.

At least one of third physical pixel size information, third standard RGB information, third gamma information, third critical chromaticity information, third palette information, and third transparency information is utilized for controlling playback of the third object image data.

In yet other embodiments, an enhanced navigation medium comprises audio/visual (A/V) data; navigation data for controlling reproduction of the A/V data by an enhanced navigation player; and structural configuration for packaging the A/V and control data, wherein the structural configuration comprises a data frame comprising an MNG (Multimedia Network Graphics) file having animation information.

The MNG file comprises MNG chunk data; and at least one of PNG (Portable Network Graphics) chunk data and JNG (JPEG Network Graphics) chunk data, for example. The MNG chunk data comprises, in some embodiments, a MNG header frame identifier; a MNG end frame identifier; and MNG control information. The first graphic file can be a MNG (Multimedia Network Graphic) file. The second graphic file can be a PNG (Portable Network Graphic) file. The third graphic file can be a JNG (JPEG Network Graphic) file. As such in some embodiments, the first graphic file is a MNG file, the second graphic file is a PNG file, and the third graphic file is a JNG file.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4 is a block diagram of an animation decoder in an element decoder of FIG. 1, illustrating the interactive disc player, in accordance with one embodiment of the invention;

FIGS. 5, 6 and 7 show exemplary data structures for a graphic file configuration, respectively;

FIGS. 8 and 9 show examples of another graphic file configuration, respectively; and FIGS. 10 and 11 show examples of yet another graphic file configuration, in accordance with one or more embodiments of the invention.

Features, elements, and aspects of the invention that are referenced by the same numerals in different figures represent the same, equivalent, or similar features, elements, or aspects in accordance with one or more embodiments of the system.

DESCRIPTION OF THE PREFERRED EMBODIMENTS

Figure 1:
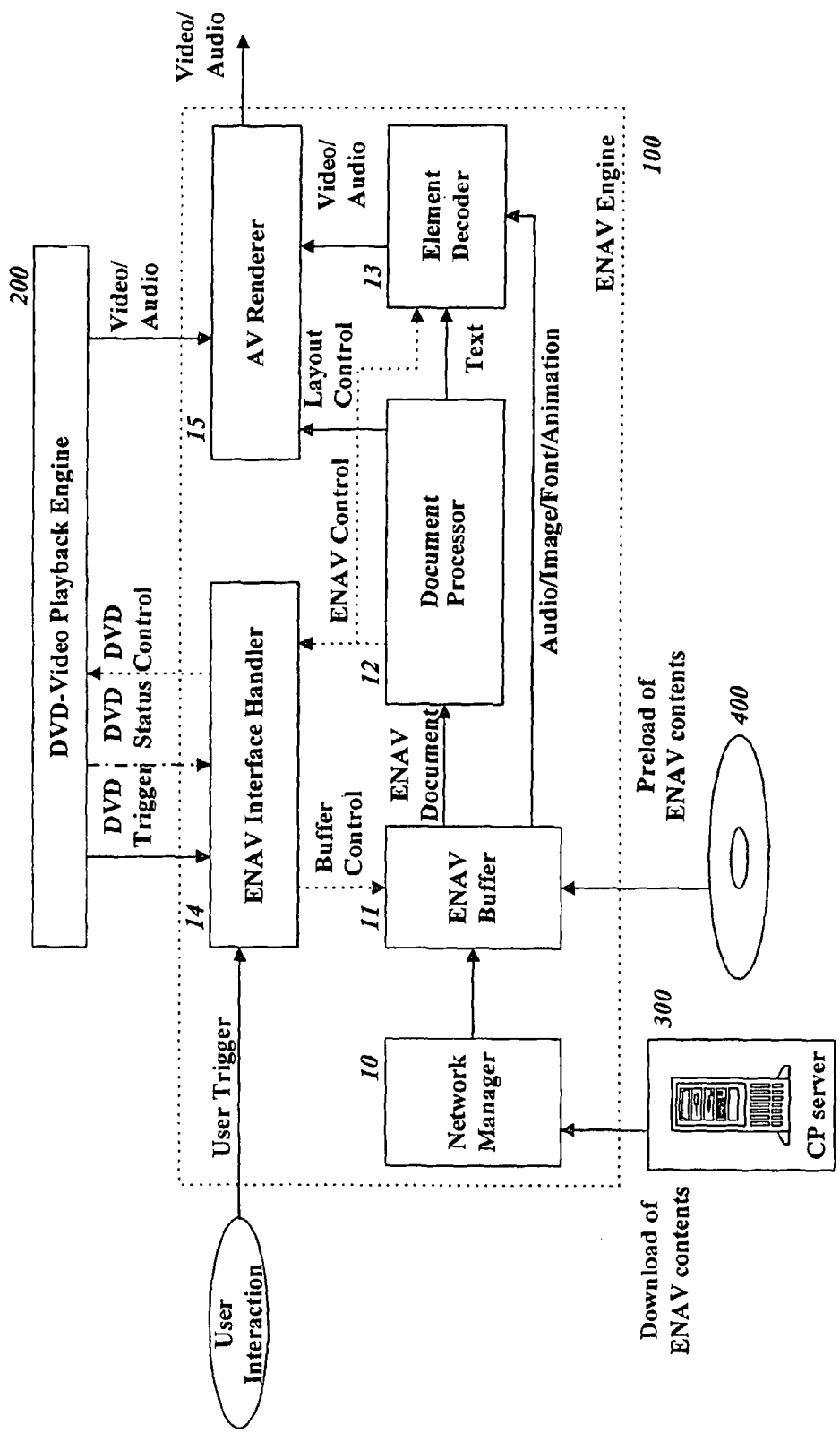
FIG. 1 is a block diagram illustrating an interactive disc player for managing animation data and its attribute information for use in an interactive optical disc, in accordance with one embodiment of the present invention.

Referring to FIG. 1, an enhanced navigation player, or an interactive disc player such as an ENAV or I-DVD player is provided. One or more embodiments of the invention are described in association with an I-DVD or enhanced navigation (ENAV) disc or disc player. It should be understood that this association is by way of example. Thus, systems and methods provided herein, may be applicable to any type of recording medium or content player device.

The interactive disc player such as an I-DVD player of FIG. 1 comprises an ENAV engine 100. The ENAV engine 100 comprises a network manager 10 for downloading ENAV contents from a content server 300 connected to a network, a ENAV buffer 11 for preloading ENAV contents recorded on a content disc 400 (e.g., I-DVD). A document processor 12 for receiving ENAV documents, and performing data processing operations relating to the ENAV documents can be also included.

An element decoder 13 for decoding text data and element data such as audio, image, font, and animation data using video or audio data, an ENAV interface handler 14 for controlling the ENAV buffer 11, performing requisite operations associated with a control signal received from the document processor 12, and receiving/transmitting a user trigger signal, DVD trigger signal, a DVD status signal, and a DVD control signal; and an AV renderer 15 for outputting audio and video signals, for example, may be also included in one or more embodiments.

Figure 2:
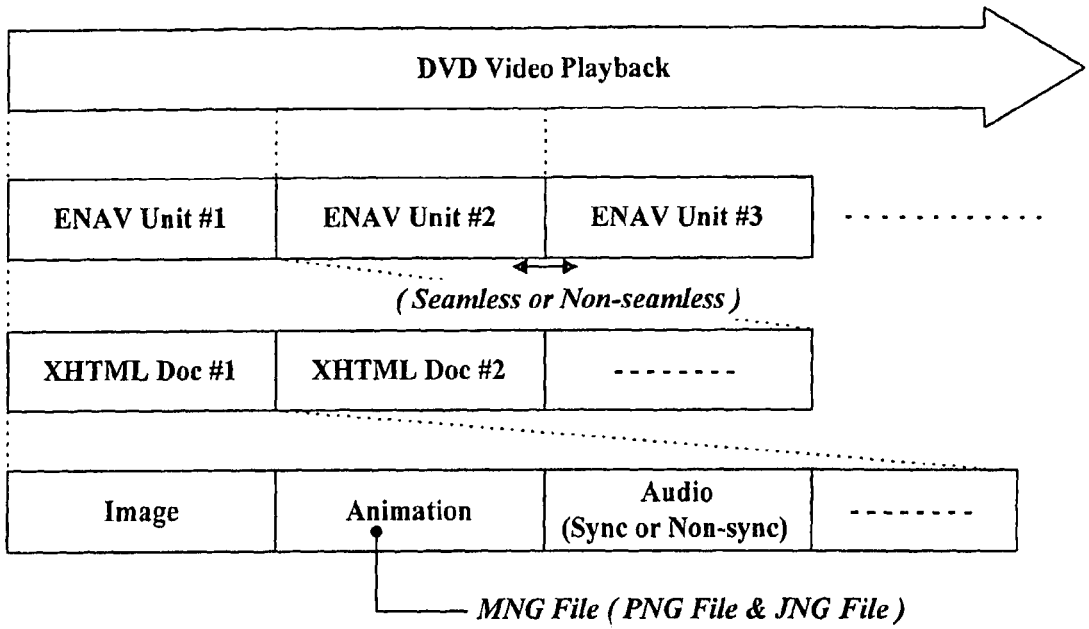
FIG. 2 is a diagram illustrating a method for reproducing the A/V data recorded on I-DVDs to be associated with animation data, in accordance with one embodiment of the present invention.

The ENAV engine 100 is connected to a DVD-Video playback engine 200. A content server 300 is connected to the network manager 10 and transmits a variety of contents data associated with A/V data recorded on the I-DVD 400, in the form of a plurality of data files. For example, as shown in FIG. 2, the ENAV content data can be transmitted on the basis of XHTML document file units and their related ENAV units composed of image, animation, audio or text/font data.

The animation data can be transmitted as a MNG (Multimedia Network Graphics) file, for example, written in a data format. The MNG file of the animation data can further include a PNG (Portable Network Graphics) file or a JNG (JPEG Network Graphics) file, for example.

Figure 3:
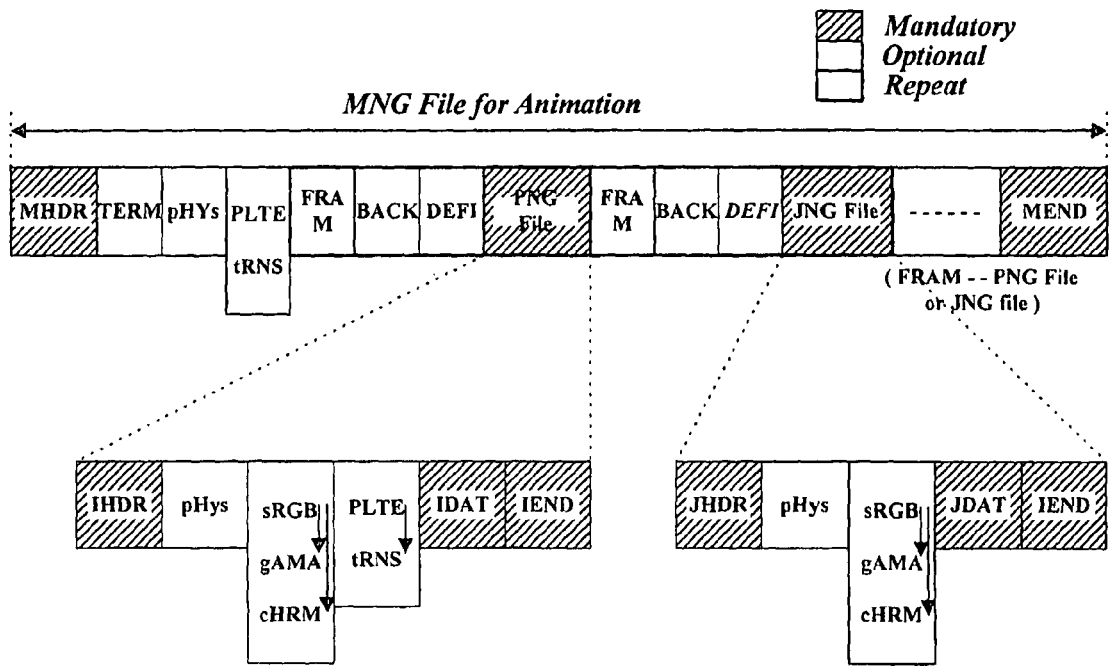
FIG. 3 is an exemplary graphic file configuration of animation data, in accordance with one embodiment of the invention.

Referring to FIG. 3, a MNG chunk data configuration and PNG and JNG chunk data configurations are provided. MNG header information (MHDR) is recorded on the head of the MNG file, for example. MNG end information (MEND) is recorded on the rear end of the MNG file. A PNG file and a JNG file of image data are further recorded in the MNG file. Various control information (TERM, pHYs, etc.) for controlling playback of image data of the PNG and JNG files can be selectively recorded in the MNG file, in certain embodiments.

PNG header information (IHDR) is recorded on the head of the PNG file, and PNG end information (IEND) is recorded on the rear end of the PNG file. Object image data (IDAT) to be displayed in the form of an animation image, and control information (pHYs, sRGB, etc.) for controlling playback of the object image data (IDAT) can be selectively recorded in the PNG file.

JNG header information (JHDR) can be recorded on the head of the JNG file, and JNG end information (IEND) may be recorded on the rear end of the JNG file. JPEG image data (JDAT) to be displayed in the form of an animation image, and control information (pHYs, sRGB, etc.) for controlling playback of the JPEG image data (JDAT) can be selectively recorded in the JNG file.

In one embodiment, the MNG file for animation data is received from the contents server 300, and is temporarily stored in the ENAV buffer 11. In other embodiments, the MNG file is read from a specified recording field of the I-DVD 400, and is temporarily stored in the ENAV buffer 11. As shown in FIG. 4, the animation decoder contained in the element decoder 13 for reproducing data of the MNG file in the form of animation images can further comprise a MNG-LC decoder 130, a PNG decoder 131, a JNG chunk parser 132, a JPEG decoder 133, and a layout manager 134.

Therefore, the MNG file of animation data is read from the I-DVD 400 or the contents provider (CP) server 300, and is divided into the PNG file and the JNG file through the MNG-LC decoder 130. Control information contained in the MNG file is also divided into the PNG and JNG files, and is then outputted to the MNG layout manager 134, in accordance with one embodiment.

The PNG decoder 131, in some embodiments, decodes the PNG file. Control information contained in the PNG file and decoded object images are transmitted to the MNG layout manager 134. The JNG file is divided into control information and JPEG image data in the JNG chunk parser 132.

The control information of the KNG file is transmitted to the MNG layout manager 134. The JPEG image data is decoded as JPEG images in the JPEG decoder 133, and is then transmitted to the MNG layout manager 134. The JNG chunk parser 132 and the JPEG decoder 133 can be integrated as one body, in some embodiments. Control information and file division actions in the MNG-LC decoder 130, the PNG decoder 131, and the JNG chunk parser 132 are classified according to chunk data types, for example.

The MNG layout manager 134 refers to the MNG control information, the PNG control information, and the JNG control information, and reproduces the decoded object images and JPEG images in the form of animation images associated with the main A/V data reproduced by the DVD engine.

The interactive optical disc player is able to reproduce the main A/V data read from the I-DVD 400, and at the same time is able to reproduce the MNG file of animation data read from either the content server 300 or the I-DVD 400 in the form of animation images associated with the main A/V data.

A method for managing animation control information of the interactive optical disc in order to effectively record additional control information, needed for controlling playback of the aforementioned animation images, on the I-DVD will hereinafter be described in more detail. It is noteworthy that, the numeric values and parameter or file names provided here are by way of example, alternative numeric values or naming conventions can be used, in other embodiments and based on implementation.

Referring to FIG. 5, MNG header information (MHDR) corresponding to critical control chunks contained in the MNG file of the animation data comprises "Frame_width" information (e.g., 0 to 720) and "Frame_height" information (e.g., 0 to 480 (576)) for restricting a frame size, and "Ticks_per_second" information (e.g., up to 24) for limiting a frame rate.

Also, the MNG header information (MHDR) may further comprise "Nominal_layer_count" information, "Nominal_frame_count" information, "Nominal_layer_count" information, and "Simplicity_profile" information, for example. The MNG end information (MEND) for indicating the end of the MNG file is recorded as a prescribed comment "Empty chunk".

Referring to FIG. 6, DEFI (Define an object) information corresponding to Image Defining Chunks of the MNG file may include "Object_id" information, "Do_not_show" information, "Concrete_flag" information, "X_location" information, "Y_location" information, "Left_cb" information, "Right_cb" information, "Top_cb" information, and "Bottom_cb" information, for example. If there is one object, the "Object_id" information and the "Concrete_flag" information are omitted, and the "Do_not_show" information is recorded as a prescribed value "0x00 visible", in accordance with one embodiment.

Information other than the "Right_cb" information and "Bottom_cb" information is recorded as a prescribed value "Default 0", for example. "PLTE" (Global palette) information includes specified information "max (256x3)B" used for indicating a number of R/G/B colors, for example. "tRNS" (Global transparency) information includes information for indicating transparency of R/G/B colors, for example.

The MNG file may further include IHDR/JHDR information, IDAT/JDAT information, and IEND information. "TERM" information comprises "Termination_action" information, "Action_after_iteration" information, "Delay" information, and "Iteration_max" information. If the "Termination_action" information is "0", it means the last display status of animation frames. If the "Termination_action" information is "1", it means that the animation frames automatically disappear after being completely displayed.

If the "Termination_action" information is "2", it means that the animation frames return to an initial frame status. If the "Termination_action" information is "3", it means that the animation frames begin their display action within the range from their first frame to their final frame, for example.

If the "Action_after_iteration" information is "0", it means the last display status of the animation frames, for example. If the "Action_after_iteration" information is "1", it means that the animation frames automatically disappear after being completely displayed, for example. If the "Action_after_iteration" information is "2", it means that the animation frames return to an initial frame status, for example.

The "Delay" information indicates an idle time period from one playback time to the next playback time. The "Iteration_max" information indicates a maximum value with which the animation frames can be repeatedly read. In the case of an infinite playback mode, the "Iteration_max" information is recorded as "0x7FFFFFF", for example.

Referring to FIG. 7, "BACK" (Background) information corresponding to the Image Displaying Chunks of the MNG file and comprises "Red_background" information, "Green_background" information, and "Blue_background" information. The "BACK" information is adapted to set up a background color of the animation frame.

The "FRAM" (Frame definitions) information, for example, comprises "Frame_mode" information and "Sub_frame_name" information that are defined in the MNG-LC Version 1.0. "IHDR" (Image header) information corresponding to critical PNG chunks contained in the PNG file of animation data comprises "Width" information (e.g., 0 to 720) and "Height" information (e.g., 0 to 480 (576)) for restricting a width and height of a display screen of the I-DVD.

"Bit Depth" information, "Color type" information, "Compression method" information, "Filter method" information, and "Interlacing method" information may be also included in one or more embodiments. As for the "Bit depth" information, if the length of data adapted to display indexes of a palette is, for example, equal to value "8", $2^8$ data expressions is available such that 256 number of colors can be displayed.

The "Color type" information for displaying colors of images is based on a PNG format. The "Compression method" information and the "Filter method" information are not set to any function. The "Interlacing method" information is recorded as a specified value "0x00" not supporting an interlacing function.

The "PLTE" (Palette) information includes "max (256x3) B" information for respectively indicating a maximum 256 number of R/G/B colors. The "IDAT" (Image Data) information records real image data. The "IEND" information for indicating the end of PNG file is recorded as a prescribed comment "Empty chunk".

Referring to FIG. 9, "tRNS" (Transparency) information corresponding to ancillary PNG chunks of the PNG file includes "max 256B" information for indicating transparencies of, for example, 256 R/G/B colors. "gAMA" (Gamma) information comprises a fixed value, for example, "45455 sRGB" adapted to support the use of sRGB. Unless the sRGB is used, it is possible for the "gAMA" information to include another value instead of "454455 sRGB", for example.

The "cHRM" (Primary chromaticities) information may comprise "White point x" information, "White point y" information, "Red point x" information, "Red point y" information, "Green point x" information, "Green point y" information, "Blue point x" information, and "Blue point y" information.

The "cHRM" information may further comprise "sRGB" (Standard RGB color space) information and "pHYs" (Physical pixel dimensions) information. "Pixels per unit x" information recorded on the "pHYs" information indicates a display aspect ratio of, for example, 4:3 or 16:9. "Pixels per unit y" indicates a value indicating a NTSC or PAL, for example.

Referring to FIG. 10, "JHDR" (JNG header) information corresponding to critical JNG chunks contained in the JNG file of animation data comprises "Width" information (0 to 720) and "Height" information (e.g., 0 to 480 (576)) for restricting a width and height of a display screen, and also "Bit Depth" information, "Color type" information, "Image_sample_depth" information, "Image_compression method" information, and "Image_interlace_method" information.

The "Image_sample_depth" information comprises a specified value, for example, "0x08" for limiting a bit size of image sample data of a JPEG file to, for example, 8 bits. The "Image_compression method" information is used for a JPEG compression of, for example, ISO 10918-1 Hoffman codes limited in I-DVDs. The "Image_interlace_method" information includes a specified value "0x00" for supporting a sequential compression.

The "JHDR" information may further comprise "Alpha_sample_depth" information, "Alpha_compression_method" information, "Alpha_filter_method" information, and the "Alpha_interlace_method" information, for example. The reference character "Alpha" is a transparency indicator, and the "Alpha_sample_depth" information is one alpha value, for example. Provided that the "Alpha_sample_depth" information is, for example, 4, $2^4$ alpha values can be created.

The "Alpha_interlace_method" information is recorded as a value "0x00", for example, not supporting an interlacing function. The "JDAT" (Image Data) information records real image data. The "IEND" information for indicating the end of JNG file is recorded as a prescribed comment "Empty chunk", for example.

Referring to FIG. 11, "gAMA" (Gamma) information corresponding to ancillary JNG chunks of the JNG file includes a fixed value of, for example, "45455 sRGB" adapted to support the use of sRGB. The "cHRM" (Primary chromaticities) information comprises "White point x" information, "White point y" information, "Red point x" information, "Red point y" information, "Green point x" information, "Green point y" information, "Blue point x" information, and "Blue point y" information, for example.

The "cHRM" information further includes "sRGB" (Standard RGB color space) information and "pHYs" (Physical pixel dimensions) information. "Pixels per unit x" information recorded on the "pHYs" information indicates a display aspect ratio of 4:3 or 16:9, for example. "Pixels per unit y" indicates a value indicating a NTSC or PAL, in certain embodiments.

Thus, in an interactive optical disc player for reproducing main A/V data and content data of a content disc, a system according to the present invention classifies a MNG file of animation data contained in the content data received from the I-DVD or the content server into a PNG file and a JNG file.

The system then decodes the image data contained in respective files, and reproduces the image data in the form of various animation images by referring to control information contained in the above files, such that the interactive optical disc player can effectively reproduce the animation data to be associated with the main A/V data, in accordance with one or more embodiments.

It should be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein.

Further, the order in which the steps of the present method are performed is purely illustrative in nature. In fact, the steps can be performed in any order or in parallel, unless indicated otherwise by the present disclosure. The method of the present invention may be performed in either hardware, software, or any combination thereof, as those terms are currently known in the art.

In particular, the present method may be carried out by software, firmware, or macrocode operating on a computer or computers of any type. Additionally, software embodying the present invention may comprise computer instructions in any medium (e.g., ROM, RAM, magnetic media, punched tape or card, compact disk (CD), DVD, etc.).

Furthermore, such software may also be in the form of a computer signal embodied in a carrier wave, or accessible through Web pages provided on computers connected to the Internet. Accordingly, the present invention is not limited to any particular platform, unless specifically stated otherwise in the present disclosure.

Thus, methods and systems for managing animation data of an interactive disc are provided. The present invention has been described above with reference to preferred embodiments. However, those skilled in the art will recognize that changes and modifications may be made in these preferred embodiments without departing from the scope of the present invention.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein.

These and various other adaptations and combinations of features of the embodiments disclosed are within the scope of the invention. The invention is defined by the claims and their full scope of equivalents.

What is claimed is:

1. A system for reproducing an audio/video data and an enhanced content data associated with the audio/video data, comprising:
   an enhanced engine, the enhanced engine comprises,
   a network manager for downloading enhanced content data from a content server connected to a network,
   an enhanced buffer for storing the enhanced content data received from the content server or recorded on a recording medium different from the enhanced buffer, wherein the enhanced content data includes a multimedia network graphic (MNG) file in chunk data format, said MNG file comprising a header portion including a frame information for restricting a frame size and a frame rate, an end portion indicating the end of the MNG file, and a PNG (Portable Network Graphics) file positioned between said header portion and said end portion, and said PNG file including an image header, an actual image data and an image trailer, the actual image data being associated with the audio/video data, the image header including a display information associated with a width and height of display screen, and the image trailer indicating the end of the PNG file,
   an element decoder for decoding the enhanced content data,
   a navigation manager, coupled to the network manager, the enhanced buffer and the enhanced decoder, to control the reproduction of the enhanced content data, and
   an audio/video renderer for outputting audio/video signals; and
   a playback engine, connected to the enhanced engine, to playback the audio/video data recorded in the recording medium,
   wherein the audio/video renderer outputs the audio/video data recorded in the recording medium and the enhanced content data received from the content server or recorded in the recording medium.

2. The system of claim 1, further comprising:
   the content server, connected to the network manager, to transmit the enhanced content data that is associated with the audio/video data recorded on the recording medium, in the form of a plurality of data files.

3. The system of claim 1, wherein the enhanced content data is transmitted on the basis of document file units composed of Mark-Up Language, Cascading Style Sheet (CSS), or Script Language and their related enhanced units composed of image, animation, audio or text/font data.

4. The system of claim 1, wherein the element decoder includes the animation decoder for decoding data of the MNG file in the form of animation images.

5. The system of claim 4, wherein the animation decoder includes a MNG-LC decoder to extract the PNG file and control information from the MNG file, and a PNG decoder to decode the image data.

6. The system of claim 5, wherein the animation decoder further includes a MNG layout manager to output the image data from the PNG decoder according to the control information.

7. The system of claim 5, wherein the animation decoder further includes a JPEG decoder to decoder JPEG image data.

8. The system of claim 1, wherein the navigation manager includes
   a document processor for receiving ENAV documents and performing data processing operations related to the ENAV documents, and
   an ENAV interface handler for controlling the enhanced buffer and performing operations in response to a control signal received from the document processor and a user interaction.

* * * * *